United States Patent
Ogiso et al.

(10) Patent No.: US 10,628,113 B2
(45) Date of Patent: Apr. 21, 2020

(54) INFORMATION PROCESSING APPARATUS

(71) Applicant: Sony Interactive Entertainment Inc., Tokyo (JP)

(72) Inventors: Toru Ogiso, Tokyo (JP); Yuji Nakamura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 160 days.

(21) Appl. No.: 15/754,771

(22) PCT Filed: Jun. 24, 2016

(86) PCT No.: PCT/JP2016/068874
§ 371 (c)(1),
(2) Date: Feb. 23, 2018

(87) PCT Pub. No.: WO2017/056597
PCT Pub. Date: Apr. 6, 2017

(65) Prior Publication Data
US 2019/0354333 A1   Nov. 21, 2019

(30) Foreign Application Priority Data

Sep. 30, 2015  (JP) ................................. 2015-193387

(51) Int. Cl.
*A63F 13/26*   (2014.01)
*A63F 13/537*  (2014.01)
(Continued)

(52) U.S. Cl.
CPC ............ *G06F 3/1454* (2013.01); *A63F 13/26* (2014.09); *A63F 13/537* (2014.09); *H04N 5/44504* (2013.01); *H04N 5/45* (2013.01)

(58) Field of Classification Search
CPC ................ A63F 13/26; G09G 2340/10; G09G 2370/20; H04N 1/42
See application file for complete search history.

(56) References Cited

U.S. PATENT DOCUMENTS 7,115,031 B2 * 10/2006 Miyamoto .............. A63F 13/06
                                                              463/1
8,845,425 B2 *  9/2014 Nogami .................. A63F 13/00
                                                              463/1
(Continued)

FOREIGN PATENT DOCUMENTS

JP     2002325963 A    11/2002
JP     2011010126 A     1/2011
(Continued)

OTHER PUBLICATIONS

International Search Report for corresponding PCT Application No. PCT/JP2016/068874, 4 pages, dated Sep. 20, 2016.
(Continued)

*Primary Examiner* — Paulos M Natnael
(74) *Attorney, Agent, or Firm* — Matthew B. Dernier, Esq.

(57) ABSTRACT

The present invention provides an information processing apparatus that can switch display modes in accordance with conditions when a plurality of display devices are allowed to display a video. The information processing apparatus executes a program for drawing videos that a first display device browsed by a first user and a second display device browsed by a second user is individually allowed to display, switches a common display mode for drawing a common video that both of the display devices are allowed to display and an individual display mode for drawing two videos of a first video that the first display device is allowed to display and a second video that the second display device is allowed to display in accordance with contents of a process of the program, and allows the first display device and the second display device to display videos to be drawn.

7 Claims, 4 Drawing Sheets

(51) Int. Cl.
  *G06F 3/14* (2006.01)
  *H04N 5/445* (2011.01)
  *H04N 5/45* (2011.01)

(56) References Cited

U.S. PATENT DOCUMENTS

| | | | | |
|---|---|---|---|---|
| 8,913,009 | B2* | 12/2014 | Takeda | A63F 13/525 |
| | | | | 345/158 |
| 8,920,235 | B2* | 12/2014 | Nogami | A63F 13/00 |
| | | | | 463/1 |
| 9,433,860 | B2* | 9/2016 | Shikata | A63F 13/843 |
| 9,436,426 | B2* | 9/2016 | Nogami | A63F 13/00 |
| 9,817,626 | B2* | 11/2017 | Ur | G06F 3/1423 |
| 2002/0165028 | A1* | 11/2002 | Miyamoto | A63F 13/06 |
| | | | | 463/46 |
| 2013/0288789 | A1* | 10/2013 | Shikata | A63F 13/26 |
| | | | | 463/31 |

FOREIGN PATENT DOCUMENTS

| | | | |
|---|---|---|---|
| JP | 2013226276 A | 11/2013 | |
| JP | 2014018324 A | 2/2014 | |

OTHER PUBLICATIONS

Extended European Search Report for corresponding EP Application No. 16850774.7, 14 pages, dated Dec. 21, 2018.
International Preliminary Report on Patentability and Written Opinion for corresponding PCT Application No. PCT/JP2016/068874, 11 pages, dated Apr. 12, 2018.

* cited by examiner

INFORMATION PROCESSING APPARATUS

TECHNICAL FIELD

The present invention relates to an information processing apparatus, information processing method, and program that allow a plurality of display devices to display videos.

BACKGROUND ART

An information processing apparatus has been used that is connected to a plurality of display devices and allows each of them to display a video. By allowing a plurality of display devices to display videos, for example, a plurality of users can play games while viewing another screen at the same time.

SUMMARY

Technical Problem

In the above-described information processing apparatus, it is desirable to be capable of displaying a video on each display device by various methods in accordance with contents to be displayed.

In view of the foregoing, it is an object of the present invention to provide an information processing apparatus, information processing method, and program that are capable of switching display modes in accordance with conditions when a plurality of video display devices are allowed to display videos.

Solution to Problem

An information processing apparatus according to the present invention is an information processing apparatus connected to a first display device browsed by a first user and a second display device browsed by a second user, includes a program execution unit configured to execute a program for drawing a video that the first display device and the second display device is individually allowed to display and switch a common display mode for drawing a common video that both the first display device and the second display device are allowed to display and an individual display mode for drawing two videos of a first video that the first display device is allowed to display and a second video that the second display device is allowed to display in accordance with contents of a process of the program; and a display control unit configured to allow the first display device and the second display device to display the video drawn by the program execution unit.

Further, an information processing method according to the present invention for allowing a first display device browsed by a first user and a second display device browsed by a second user to display a video, includes a step of executing a program for drawing a video that the first display device and the second display device is individually allowed to display and switching a common display mode for drawing a common video that both the first display device and the second display device are allowed to display and an individual display mode for drawing two videos of a first video that the first display device is allowed to display and a second video that the second display device is allowed to display in accordance with contents of a process of the program; and a step of allowing the first display device and the second display device to display the video drawn by the program.

Still further, a program according to the present invention is a program for causing a computer connected to a first display device browsed by a first user and a second display device browsed by a second user to function as: drawing means for executing a process of drawing a video that the first display device and the second display device is individually allowed to display and switching a common display mode for drawing a common video that both the first display device and the second display device are allowed to display and an individual display mode for drawing two videos of a first video that the first display device is allowed to display and a second video that the second display device is allowed to display in accordance with contents of the process. This program may be stored in a computer-readable non-transitory information storage medium for provision.

DESCRIPTION OF EMBODIMENTS

Hereinafter, embodiments of the present invention will be described below in detail with reference to the accompanying drawings.

Figure 1:
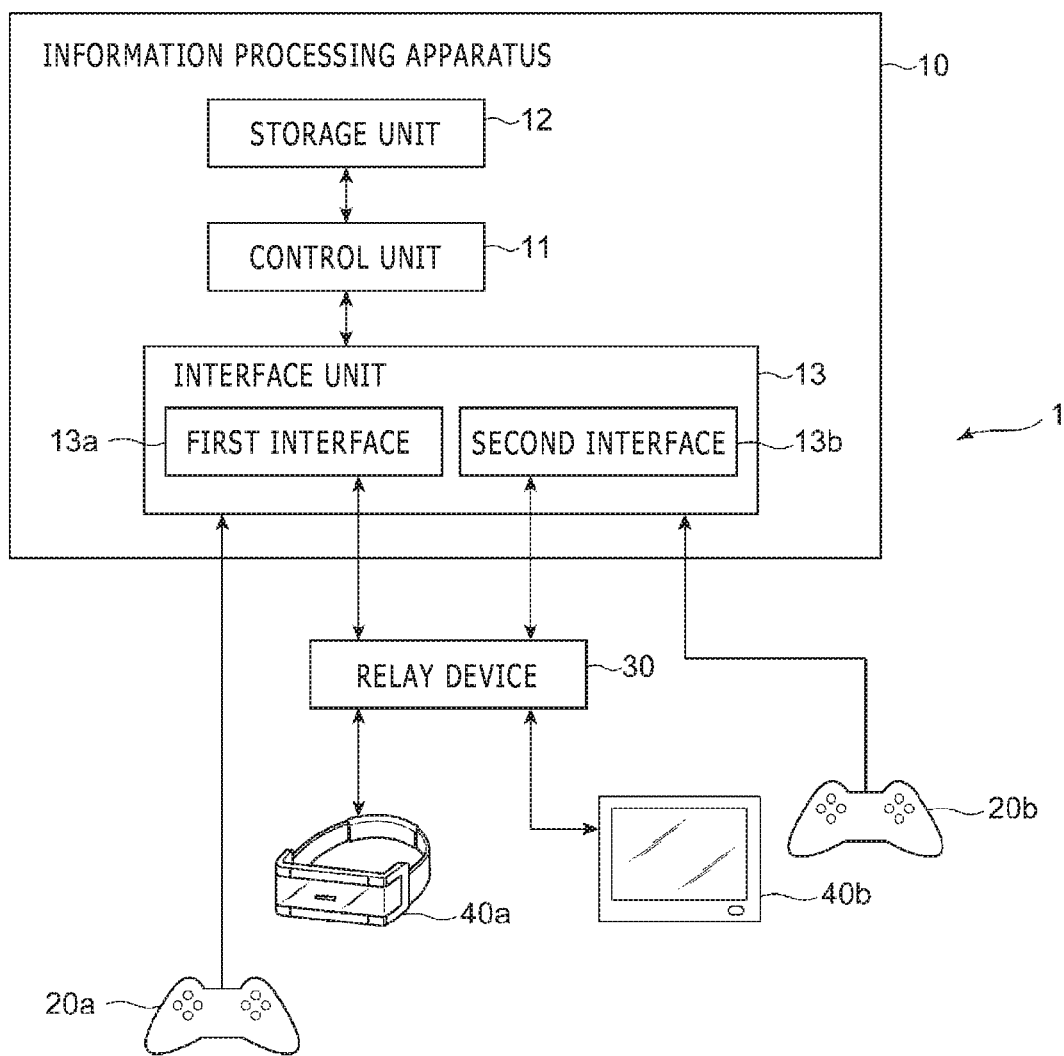
FIG. 1 is a configuration block diagram illustrating a configuration of a video display system including an information processing apparatus according to an embodiment of the present invention.

FIG. 1 is a configuration block diagram illustrating a configuration of a video display system 1 including an information processing apparatus 10 according to one embodiment of the present invention. As illustrated in the figure, the video display system 1 includes the information processing apparatus 10, a first operation device 20a, a second operation device 20b, a relay device 30, a first display device 40a, and a second display device 40b. Hereinafter, the first operation device 20a and the second operation device 20b will be collectively referred to as an operation device 20. Also, the first display device 40a and the second display device 40b will be collectively referred to as display devices 40.

The information processing apparatus 10 is an apparatus that supplies videos to be displayed by the display devices 40, and may be, for example, a home game player, a portable video game player, a personal computer, a smartphone, a tablet, or the like. As illustrated in FIG. 1, the information processing apparatus 10 includes a control unit 11, a storage unit 12, and an interface unit 13.

The control unit 11 includes at least one processor such as a central processing unit (CPU), and executes programs stored in the storage unit 12 to perform various types of information processing. In addition, a specific example of processing performed by the control unit 11 in the present embodiment will be described below. The storage unit 12 includes at least one memory device such as a random access memory (RAM), and stores programs executed by the control unit 11 and data processed by the programs.

The interface unit 13 performs data communication with the first operation device 20a, the second operation device 20b, and the relay device 30 through any one of wired manner and wireless manner. The information processing apparatus 10 receives signals indicating contents of an operation input of a user for the first operation device 20a and the second operation device 20b via the interface unit 13, or transmits video signals of videos to be displayed by the first display device 40a and the second display device 40b.

In particular, in the present embodiment, the interface unit 13 includes a first interface 13a and second interface 13b that perform data communication on the basis of a communication standard different from each other. Any of the first interface 13a and the second interface 13b perform data communication with the relay device 30. In here, the first interface 13a is assumed to be a multimedia interface for use in transmissions of videos or voices, such as an HDMI (High-Definition Multimedia Interface: trademark). In addition, the second interface 13b is assumed to be a general-purpose data communication interface capable of transmission and reception of various types of data, such as a USB.

The first operation device 20a and the second operation device 20b are controllers etc. of a home game player and are used in order to perform various kinds of instruction operations to the information processing apparatus 10 through the user. In the present embodiment, it is assumed that two persons of a first user U1 and a second user U2 use the information processing apparatus 10 at the same time, and the first user U1 and the second user U2 use the first operation device 20a and the second operation device 20b, respectively. Contents of the operation input of the users for each operation device 20 are transmitted to the information processing apparatus 10 by any one of wired manner and wireless manner. Each operation device 20 may include an operation button, a touch panel, or the like placed on an enclosure surface of the information processing apparatus 10.

The relay device 30 accepts video data supplied from the information processing apparatus 10 and outputs video signals corresponding to the accepted data to the first display device 40a and the second display device 40b. At this time, to the supplied video data, the relay device 30 may perform correction processing etc. for canceling a distortion occurring due to an optical system of the display devices 40 of an output destination and output the corrected video signals. In addition to the video data, the relay device 30 relays various types of information transmitted and received between the information processing apparatus 10 and the display devices 40, such as voice data or control signals.

The first display device 40a and the second display device 40b are connected to the relay device 30 through a communication interface capable of the transmission of videos; further, display videos according to the video signals input from the relay device 30 and allows the users to browse the videos. In the present embodiment, the first user U1 browses videos displayed by the first display device 40a and the second user U2 browses videos displayed by the second display device 40b.

The first display device 40a and the second display device 40b are assumed to display videos by using mutually different methods. As a specific example, it is assumed that the first display device 40a is a video display device of a type used by mounting to a head section of the user, such as a head mount display and the second display device 40b is a stationary-type display device that displays videos on a tabular screen such as a liquid crystal display. The first display device 40a displays videos right in front of the first user U1 with the first user U1 mounting the first display device 40a on the head section. This processing permits only the first user U1 to browse the videos displayed by the first display device 40a. Further, the first display device 40a is assumed to be a non-transmission-type display device in which the mounted first user U1 cannot visually recognize the outer world. Therefore, the first user U1 cannot browse videos displayed by the second display device 40b while using the first display device 40a and only the second user U2 can browse the videos displayed by the second display device 40b.

In the embodiment, the information processing apparatus 10 is further assumed to include means for specifying an attitude of the first display device 40a in order to realize head tracking control to be hereinafter described. Specifically, for example, the first display device 40a includes a motion sensor that measures information relating to its own position, direction or movement. The motion sensor may be, for example, an acceleration sensor, a gyroscope, a geomagnetic sensor, or the like. Measurement results of the motion sensor are transmitted to the information processing apparatus 10 via the relay device 30. The information processing apparatus 10 uses the measurement results of the motion sensor to thereby measure a parallel movement or a change in the direction of the first display device 40a. In place of or in addition to such a motion sensor, the first display device 40a may include a light emitting element for tracking a position or tilt of the first display device 40a. By photographing light emitted from this light emitting element by using a camera and analyzing that position, it is possible for the information processing apparatus 10 to specify a change in the position or tilt of the first display device 40a.

Figure 2:
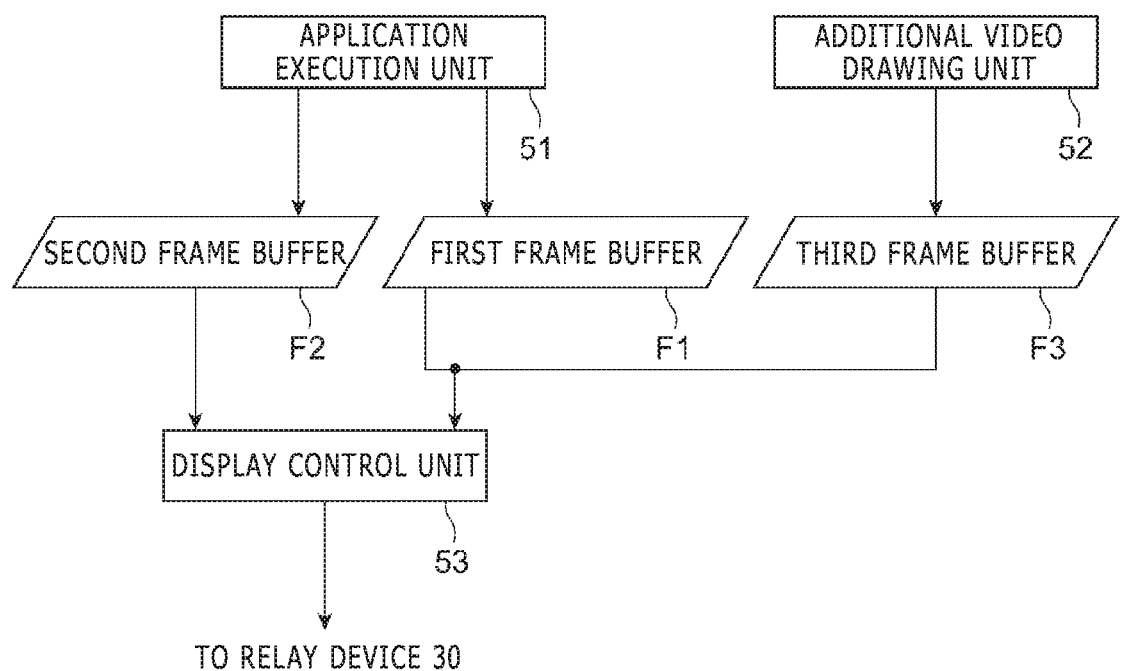
FIG. 2 is a functional block diagram illustrating functions of the information processing apparatus according to the present embodiment.

Hereinafter, functions realized by the information processing apparatus 10 will be described with reference to FIG. 2. As illustrated in FIG. 2, in view of the functions, the information processing apparatus 10 includes an application execution unit 51, an additional video drawing unit 52, and a display control unit 53. The control unit 11 executes a plurality of programs stored in the storage unit 12, and thereby these functions are realized. These programs may be provided to the information processing apparatus 10 via a communication network such as Internet, or stored in a computer readable information storage medium such as an optical disk for provision.

The application execution unit 51 is realized by executing an application program through the control unit 11 and the application execution unit 51 performs drawing processing of videos to be displayed by each display device 40. Specifically, for example, the application execution unit 51 may be realized by executing an application program of a game through the control unit 11. In this case, the application execution unit 51 draws a game image indicating a progress of the game. In the present embodiment, the application execution unit 51 is further assumed to select any one of two display modes and draw a video that each display device 40 is allowed to display by the selected display mode. The two display modes indicate a common display mode and an individual display mode.

The common display mode is a display mode for allowing two display devices 40 to display common videos. In the case of the common display mode, it is only required for the application execution unit 51 to draw one video. Hereinafter, the video drawn by the application execution unit 51 by using the common display mode will be referred to as a common video Mc. The drawn common image Mc is transmitted to the relay device 30 by the display control unit 53 to be hereinafter described. If necessary, the relay device 30 applies distortion correction, color correction, etc. to a first video M1 in accordance with display characteristics of each display device 40 and outputs video signals of the corrected common video Mc to each display device 40. This processing permits the first display device 40*a* and the second display device 40*b* to display videos of the same contents, and the first user U1 and the second user U2 to browse the same videos.

In particular, in the present embodiment, since the first display device 40*a* is a head mounted type display device, a frame image finally displayed by the first display device 40*a* needs to include a left-eye image and a right-eye image. Therefore, for example, as a frame image of the common video Mc, the application execution unit 51 draws an image including the left-eye image and the right-eye image. In this case, the relay device 30 extracts a portion from the frame image of the common video Mc received from the information processing apparatus 10, and thereby generates a frame image that the second display device 40*b* is allowed to display. Through this processing, the application execution unit 51 only draws one common video Mc, and thereby it is possible to allow the two display devices 40 to display videos common to each other. In contrast, as the frame image of the common video Mc, the application execution unit 51 may draw only one image capable of being displayed by the second display device 40*b*. In this case, on the basis of one frame image, the relay device 30 generates the left-eye image and the right-eye image and allows the first display device 40*a* to display the left-eye image and the right-eye image. At any rate, due to a difference between the display characteristics, also in the common display mode, the first display device 40*a* and the second display device 40*b* do not always display perfectly the same video. However, on the basis of one frame image drawn by the application execution unit 51, an image for display corresponding to each display device 40 is generated, and thereby the two display devices 40 display a video in which contents are approximately common to each other.

The individual display mode is a display mode for allowing the two display devices 40 to display videos different from each other. In the case of the individual display mode, the application execution unit 51 draws two videos different from each other. Hereinafter, the video drawn for the display of the first display device 40*a* by the application execution unit 51 will be referred to as the first video M1 and the video drawn for the display of the second display device 40*b* by the application execution unit 51 will be referred to as a second video M2. For example, when the application execution unit 51 realizes a game of a multi-play, the first video M1 is a game video for the first user U1 and the second video M2 is a game video for the second user U2. In here, the first video M1 is assumed to be a video based on the same standard as that of the common video Mc. That is, the first video M1 and the common video Mc are a video common to each other in a resolution, a frame rate, and the like. On the other hand, the second video M2 is assumed to be a video of the standard different from that of the first video M1. For example, the second video M2 may be a video lower than the first video M1 in the resolution and the frame rate. This processing permits a data transfer quantity required for transmission of the second video M2 to be reduced.

In the present embodiment, in order to store a frame image of the video drawn by the application execution unit 51, a first frame buffer F1 and a second frame buffer F2 are secured in the storage unit 12. The frame images of the common video Mc and the first video M1 are written in the first frame buffer F1 and the frame image of the second video M2 is written in the second frame buffer F2. As described above, the common video Mc and the first video M1 are videos of the same standard and are not drawn at the same time, and therefore it is possible to use the same first frame buffer F1.

The application execution unit 51 switches the common display mode and the individual display mode as needed in accordance with process contents in execution. For example, when displaying a result screen etc. of a game common to a plurality of users, the application execution unit 51 selects the common display mode and, when displaying a play screen indicating conditions in the game play to each user, selects the individual display mode. As described above, it is impossible for the first user U1 and the second user U2 to browse videos other than that displayed on the display devices 40 used by the user himself/herself and it is impossible to browse the display contents of the display devices 40 of the other party. Therefore, for example, a video in which it is not preferable to be viewed by an opponent like contents of a hand in the card game is assumed to be displayed in the individual display mode. As described above, the application execution unit 51 switches the display modes in accordance with the process contents in execution of the process, and thereby the video can be presented to each user by using a mode appropriate for contents of the displayed video.

The additional video drawing unit 52 draws another video that is realized by using a program (a system program etc.) different from an application program executed by the application execution unit 51 and that the display devices 40 are allowed to display independently of the application program. Hereinafter, the video drawn by the additional video drawing unit 52 will be referred to as an additional video Ma. For example, the additional video Ma may be a system video representing various types of information to be presented to the user in relation to the usage of the information processing apparatus 10, such as a message, warning information, or a menu screen to be notified to the user. While the process is performed by using the application execution unit 51, the additional video drawing unit 52 does not always draw the additional video Ma, but starts drawing of the additional video Ma, if necessary. For example, when an event (for example, incoming of a message from the outside or the like) to be notified to the user occurs, when an operation to be requested to display a system menu is accepted from the user, or the like, the additional video drawing unit 52 draws the additional video Ma.

In the present embodiment, the additional video drawing unit 52 is assumed to draw the additional video Ma on the basis of the same standard as those of the common video Mc and the first video M1. The frame image of the additional video Ma is written in the third frame buffer F3 different from the first frame buffer F1 and the second frame buffer F2. In addition, it is assumed that when the additional video Ma is drawn not in the entire drawing region but in only a portion of region, the additional video drawing unit 52 transparentizes a background region other than the portion of region. Through the processing, as described below, it is possible to perform synthesizing processing in which the additional video Ma is overlapped on a front face of the common video Mc or the first video M1 to obtain one video.

The display control unit 53 outputs video signals representing videos drawn by the application execution unit 51 and the additional video drawing unit 52 to the relay device 30 to thereby allow the first display device 40a and the second display device 40b to display the videos. In the same manner as in the additional video drawing unit 52, the display control unit 53 may be realized by executing a system program etc. through the control unit 11. In here, the display control unit 53 changes contents of the process in accordance with the display mode. First, the display control unit 53 accepts an instruction from the application execution unit 51, and thereby subsequently determines that the videos are displayed by using which display mode of the common display mode and the individual display mode. Then, the display control unit 53 notifies the relay device 30 of the determined display mode. Afterward, the display control unit 53 generates video signals and outputs the video signals in a mode suitable for the determined display mode.

Figure 3:
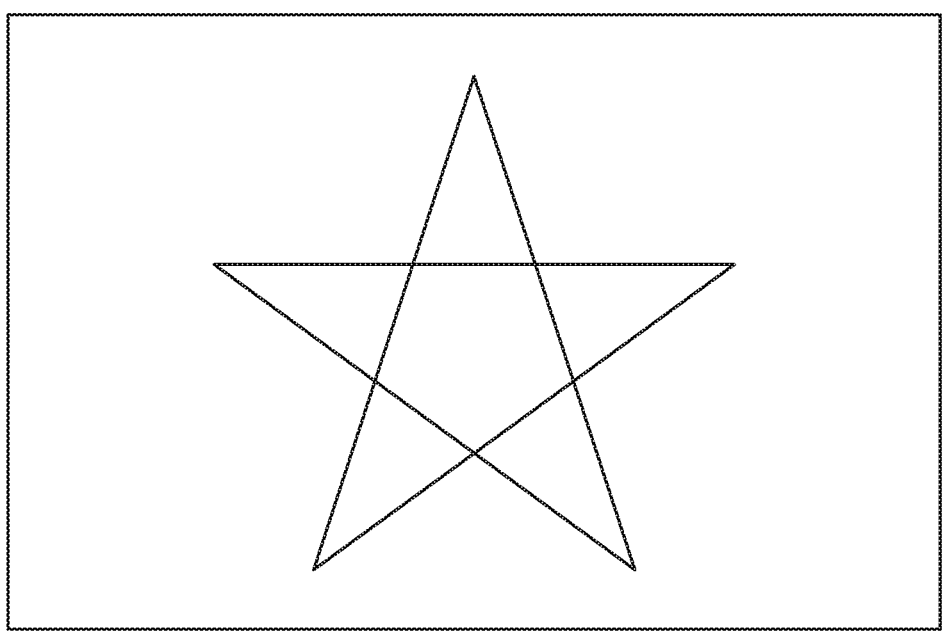
FIG. 3 is a diagram illustrating one example of a common video.
Figure 4:
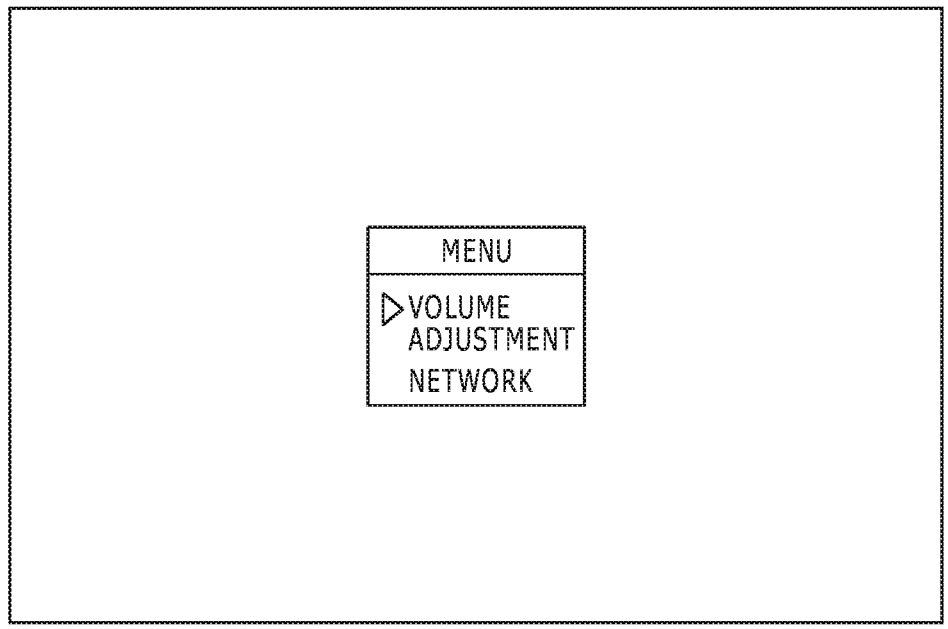
FIG. 4 is a diagram illustrating one example of an additional video.
Figure 5:
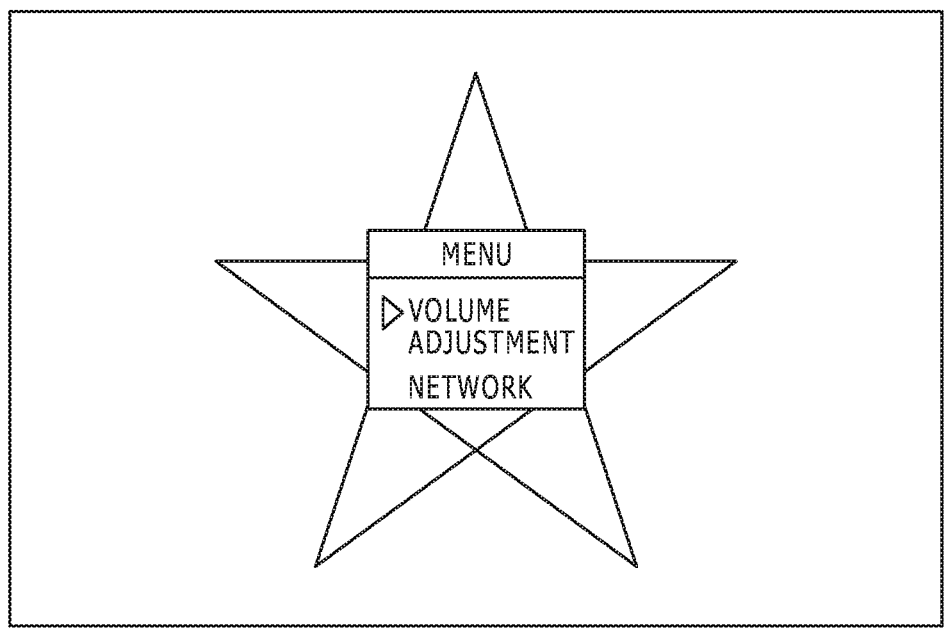
FIG. 5 is a diagram illustrating one example of a synthesized video.

Specifically, in the case of the common display mode, the display control unit 53 generates a synthesized video obtained by synthesizing the common video Mc and the additional video Ma. Then, the display control unit 53 transmits a video signal of the generated synthesized video to the relay device 30 via the first interface 13a. On the basis of this video signal, the relay device 30 allows both the first display device 40a and the second display device 40b to display the synthesized video. Through this processing, it is possible for both the first user U1 and the second user U2 to browse the common video Mc and the additional video Ma displayed overlapping on the common video Mc during the display of the common display mode. In addition, the display control unit 53 overlaps both of the frame images so that the frame image drawn in the third frame buffer F3 is arranged in the front side of the frame image drawn in the first frame buffer F1, and generates the frame image of the synthesized video. FIGS. 3 to 5 are diagrams for explaining the synthesizing processing of this video; further, FIG. 3 and FIG. 4 illustrate one example of the frame image of the common video Mc and one example of the frame image of the additional video Ma, respectively. Further, FIG. 5 illustrates the frame image of the synthesized video obtained by overlapping the frame image of FIG. 4 on the front face of the frame image of FIG. 3, and such images are presented to each user.

In contrast, in the case of the individual display mode, the display control unit 53 transmits video signals of the synthesized video obtained by synthesizing the first video M1 and the additional video Ma by the same processing as that of the common display mode to the relay device 30 via the first interface 13a. In parallel with the above, the display control unit 53 transmits video signals of the second video M2 drawn in the second frame buffer F2 to the relay device 30 via the second interface 13b. The relay device 30 allows the first display device 40a to display the synthesized video transmitted via the first interface 13a and allows the second display device 40b to display the second video M2 transmitted via the second interface 13b. This processing permits the information processing apparatus 10 to transmit two videos different from each other in parallel and the two display devices 40 to display the two videos.

As described above, also in any display mode, the additional video Ma is synthesized with the video drawn in the first frame buffer F1. As described above, the additional video Ma is drawn as a video of the same standard as those of the common video Mc and the first video M1, and therefore it is possible to perform the synthesis for each such a frame image. On the other hand, in the present embodiment, the first video M1 and the second video M2 are assumed to be videos of the standards different from each other. Therefore, it is difficult to synthesize the additional video Ma with the second video M2 as it is. Video standards of the common video Mc and the first video M1 are matched, and at the same time the additional video Ma is synthesized with the first video M1 and is prevented from being synthesized with the second video M2 in the individual display mode; as a result, the additional video drawing unit 52 does not need to draw a plurality of types of the additional video Ma according to a plurality of the video standards.

Note, however, that, in accordance with such control, in the individual display mode, the first display device 40a displays the synthesized video obtained by synthesizing the first video M1 and the additional video Ma and the second display device 40b displays only the second video M2. Therefore, in the individual display mode, the second user U2 cannot browse contents of the additional video Ma. In the present embodiment, not only the application execution unit 51 but also the additional video drawing unit 52 is assumed to switch the display modes, if necessary. Hereinafter, several specific examples of control in which the additional video drawing unit 52 switches the display modes will be described.

As a first example, when the additional video Ma is drawn while the application execution unit 51 draws two videos in the individual display mode, the additional video drawing unit 52 may always switch the display mode to the common display mode. At this time, the display control unit 53 generates a synthesized video by synthesizing the additional video Ma with the first video M1 drawn for display of the first display device 40a by the application execution unit 51 and allows both the first display device 40a and the second display device 40b to display the synthesized video. That is to say, when the switching from the individual display mode to the common display mode is performed in accordance with an instruction from the additional video drawing unit 52, the application execution unit 51 continues to draw the first video M1 and the second video M2 premised on operations in the individual display mode without relation to such switching. The application execution unit 51 writes any of the common video Mc and the first video M1 in the same first frame buffer F1. Therefore, not considering that the application execution unit 51 draws which of the common video Mc and the first video M1, the display control unit 53 simply synthesizes the video written in the first frame buffer F1 and the additional video Ma to thereby generate the synthesized video to be displayed in common to the two display devices 40. This control permits both of two users to definitely browse the additional video Ma.

Subsequently, as a second example, when the additional video Ma is drawn in accordance with a request of the user, the additional video drawing unit 52 may determine whether or not the display mode is switched in accordance with any one of users as a source of request. For example, when the first user U1 requests to operate the first operation device 20a and display a system menu, it is only required for the first user U1 to browse the additional video Ma. Therefore, the additional video drawing unit 52 does not perform the switching from the individual display mode to the common display mode but draws the additional video Ma including the system menu as it is. The drawn additional video Ma is synthesized with the first video M1 by the display control unit 53 and is displayed by the first display device 40a as the synthesized video. In this case, the second display device 40b continues to display the second video M2 as it is. In contrast, when the second user U2 operates the second operation device 20b and requests to display the system menu during the display in the individual display mode, the additional video drawing unit 52 switches the display mode to the common display mode and then draws the additional video Ma. Through this processing, the additional video Ma synthesized with the first video M1 is displayed also on the second display device 40b and it is possible for the second user U2 to browse the system menu.

As a third example, when the additional video Ma including a notification for the user is drawn, the additional video drawing unit 52 may determine whether or not the display mode is switched in accordance with a type of the notification to be displayed. For example, when contents of a notification having a high level of importance are displayed, the additional video drawing unit 52 performs the switching from the individual display mode to the common display mode and then draws the additional video Ma including the notification contents. On the other hand, when the notification contents having a low level of importance are displayed, the additional video drawing unit 52 does not perform the switching but draws the additional video Ma. Through this processing, the notification having a high level of importance is presented to both of two users and the notification having a low level of importance can be presented to only the first user U1 without preventing the individual display mode. Further, the additional video drawing unit 52 may determine whether or not the display mode is switched in accordance with a destination of the notification. Specifically, when the notification for the second user U2 is displayed, the switching to the common display mode is performed; on the other hand, when the notification for the first user U1 is displayed, the switching is not performed and the additional video Ma is drawn. This processing permits a partner to present the notification to browse the contents. In addition, the above-described second example and third example may be used in combination with each other.

In the examples as described above, while the application execution unit 51 draws two videos on the premise of the display in the individual display mode, the display mode is switched to the common display mode by the additional video drawing unit 52. Therefore, while the display mode is switched to the common display mode, the second video M2 drawn by the application execution unit 51 is not presented to the second user U2 but is neglected. When the drawing of the additional video Ma is finished in accordance with operations of the user, the elapse of time, or the like, the additional video drawing unit 52 performs the switching for returning the display mode to the individual display mode at that timing. Through this processing, after the display of the additional video Ma is finished, returning to a former state, the first video M1 and second video M2 drawn by the application execution unit 51 are presented to each user.

Figure 6:
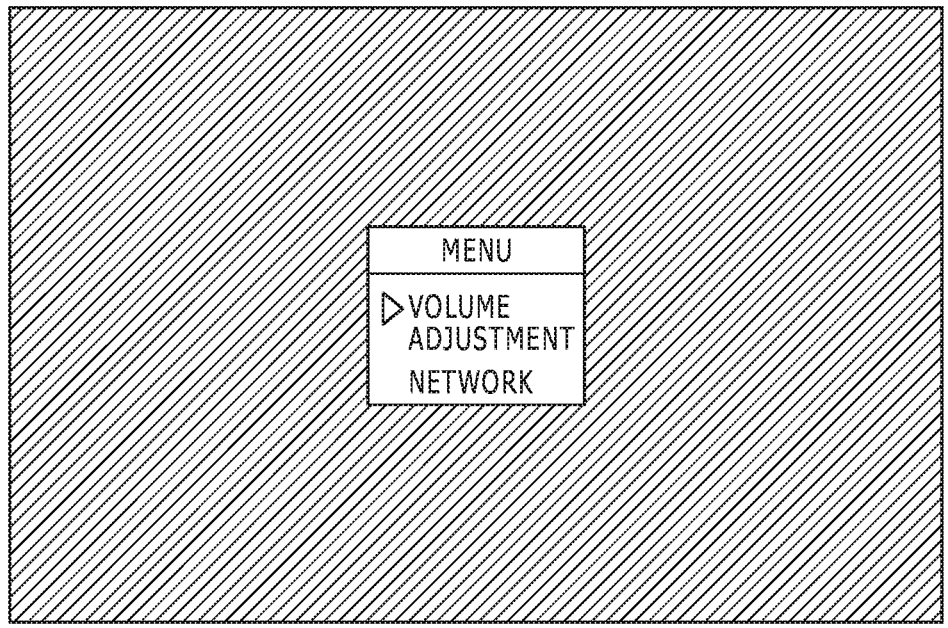
FIG. 6 is a diagram illustrating another example of the synthesized video.

In the above examples, the application execution unit 51 may draw a video desired to be browsed to only the first user U1 as the first video M1. In that case, possibly, when the additional video drawing unit 52 switches the display mode to the common display mode independently of the application execution unit 51, the second user U2 also can browse contents of the first video M1 inconvenient to be browsed to the second user U2. When the switching from the individual display mode to the common display mode is performed independently of the application execution unit 51, the additional video drawing unit 52 may draw the additional video Ma so as to cover the entire drawing region. Specifically, for example, a frame image painted out by a particular color such as black is assumed to be drawn at the background region on the outside of the system menu. Through this processing, when synthesizing the additional video Ma with the first video M1, the entire first video M1 is masked and not displayed on any of the display devices 40. FIG. 6 illustrates an example in which such drawing is performed and the pained-out background region is indicated by diagonal hatching. Note that when the additional video Ma is drawn without involving the switching of the display mode (when the additional video Ma is drawn in accordance with a request of the first user U1 or the like), such a mask is not required, and therefore it is only required for the additional video drawing unit 52 to normally draw the additional video Ma in which the background region is transparent.

In the present embodiment, the video displayed on the first display device 40a may be a video to be updated on the basis of the head tracking control. The head tracking control herein is control for changing the displayed video on the basis of a change in the attitude of the first display device 40a mounted on the head section by the first user U1. Hereinafter, a specific example of the head tracking control will be described.

Figure 7:
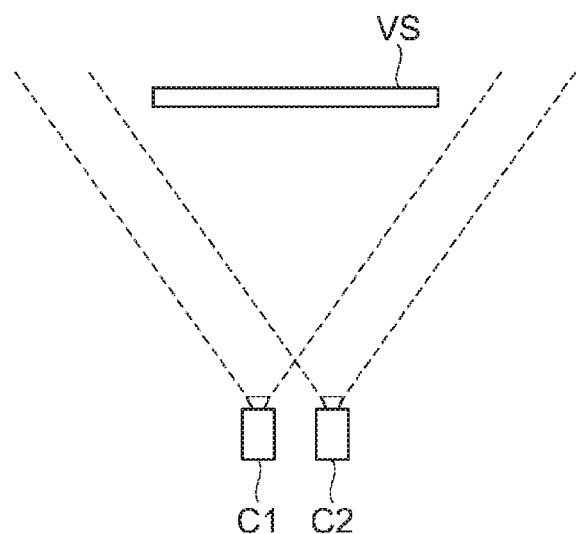
FIG. 7 is a diagram for explaining a specific example of a method for realizing head tracking control.

FIG. 7 is a diagram illustrating a specific example of the head tracking control. This figure illustrates a state obtained by viewing, from the above, a virtual space in which a virtual screen VS and two view point cameras C1 and C2 are arranged. As illustrated in the figure, in the display control unit 53, the virtual screen VS is arranged in the virtual space and the two view point cameras C1 and C2 are arranged at positions opposite to this virtual screen VS. The two view point cameras C1 and C2 are arrayed apart from each other by a predetermined distance along a transverse direction. Then, an image to be a display object is pasted as a texture on a surface of the virtual screen VS. The image to be a display object herein is a frame image obtained by synthesizing the frame image in the third frame buffer F3 with the frame image written in the first frame buffer F1. In this state, the display control unit 53 draws an image indicating a state obtained by viewing an internal portion of the virtual space from the view point camera C1 and generates a left-eye video. Further, the display control unit 53 draws an image indicating a state obtained by viewing an internal portion of the virtual space from the view point camera C2 and generates a right-eye video. The display control unit 53 repeats such processing whenever the frame image is updated, and thereby generates the synthesized video. The first display device 40a displays the thus-generated synthesized video, and thereby the user can browse, in three dimensions, a state in which the synthesized video is photographed on the virtual screen VS that is present at a distant position ahead of the user himself/herself.

Further, the display control unit 53 changes directions (visual line directions) of the two view point cameras C1 and C2 in accordance with a change in the direction of the first display device 40a. Further, the display control unit 53 changes the positions of the two view point cameras C1 and C2 in accordance with a parallel shift of the first display device 40a. Specifically, when a direction of the first display device 40a is changed, the display control unit 53 rotates the view point cameras C1 and C2 in the same rotation direction as that of the above rotation and by the same rotation amount as that of the above rotation. At this time, the view point cameras C1 and C2 rotate in the virtual space while keeping a mutual distance with both of center positions set as the rotation center. Further, when the first display device 40a moves in parallel from a reference position, the display control unit 53 moves both of the view point cameras C1 and C2 in the virtual space in accordance with the moving direction and amounts of movement thereof. Then, a state obtained by viewing the virtual screen VS is drawn from each of the view point cameras C1 and C2 in which the positions and the direction are changed, and thereby the left-eye video and the right-eye video are generated. This processing permits the first user U1 to browse videos to be displayed in a sense as if the synthesized video is photographed on a screen fixed in the air. Further, for example, the user changes a direction or position of a face so that the proximity of the outer periphery of the displayed video comes to the center of a field of view, and thereby the user can browse the videos while noticing the display contents in the proximity of the outer periphery that is hard to visually recognize in an initial state.

In the common display mode, the video signals generated on the basis of the above-described control are used for display of both the first display device 40a and the second display device 40b. Therefore, when the head tracking control is performed during the display in the common display mode, the videos displayed on the second display device 40b also are changed in conjunction with movements of the head of the first user U1. When the switching from the individual display mode to the common display mode is performed, the display control unit 53 may interrupt the head tracking control on the basis of predetermined conditions. Specifically, for example, when the additional video drawing unit 52 performs the switching to the common display mode in accordance with a request of the second user U2, the display control unit 53 is assumed to interrupt the head tracking control. In such conditions, the additional video Ma needs to be displayed on the second display device 40b so as to be easily viewed by the second user U2. Therefore, the display control unit 53 performs control so that the head tracking control is interrupted and the additional video Ma is displayed approximately at the center of the display region, and thereby the second user U2 easily browses contents of the additional video Ma.

Further, when the additional video drawing unit 52 finishes the common display mode and performs the switching to the individual display mode in the state in which the head tracking control is interrupted, the display control unit 53 is assumed to restart the interrupted head tracking control. When the head tracking control is restarted, desirably, the display control unit 53 updates the positions of the view point cameras C1 and C2 in accordance with positions or direction of the first display device 40a at a time point for restarting the head tracking control and then generates an image to be displayed. Through the processing, it is possible not to change a virtual position of the screen VS before and after the interruption of the head tracking control. Note, however, that, on the basis of such control, the screen VS is instantaneously felt to be a large movement at the time of restarting the head tracking control and an uncomfortable feeling may be given to the first user U1. The display control unit 53 may perform fade-in control for displaying videos by gradation at the time of restarting the head tracking control.

In accordance with the information processing apparatus 10 according to the above-described present embodiment, the application execution unit 51 and the additional video drawing unit 52 individually switches the individual display mode and the common display mode to thereby allow the first display device 40a and the second display device 40b to display videos in a mode suitable for the display contents.

In addition, the embodiments of the present invention are not limited to the above-described embodiments. In the above descriptions, for example, the additional video Ma is assumed to be a video of the same standard as that of the common video Mc or the first video M1; further, the additional video Ma may be not necessarily drawn on the basis of the same standard as that of the common video Mc or the first video M1. In this case, before the additional video Ma is synthesized with the common video Mc or the first video M1, the display control unit 53 may perform the image processing necessary for the synthesis, such as the additional video Ma is enlarged or reduced. Further, the first video M1 and the second video M2 may be a video of the same standard as each other. Also in those cases, the additional video Ma is not synthesized with the second video M2 but is limited so as to be synthesized with only the common video Mc and the first video M1, and thereby complexity of the image processing can be avoided.

Further, a portion or the whole of the processing to be performed by the relay device 30 in the above descriptions may be realized by the information processing apparatus 10. Further, when the processing of the relay device 30 is realized by using the information processing apparatus 10, the relay device 30 may not be included. In this case, the first display device 40a and the second display device 40b are connected directly to the information processing apparatus 10. Further, in the above descriptions, the first display device 40a is assumed to be a head mounted type display device and the second display device 40b is assumed to be a stationary display device; further, each of the display devices 40 may be another type of display device.

Further, in the above descriptions, the first interface 13a and the second interface 13b are assumed to transmit video signals on the basis of the communication standards different from each other; further, both the first interface 13a and the second interface 13b may transmit video signals on the basis of the same communication standard. Further, each video may be transmitted via the same interface.

REFERENCE SIGNS LIST

1 Video display system, 10 Information processing apparatus, 11 Control unit, 12 Storage unit, 13 Interface unit, 13a First interface, 13b Second interface, 20a First operation device, 20b Second operation device, 30 Relay device, 40a First display device, 40b Second display device, 51 Application execution unit, 52 Additional video drawing unit, 53 Display control unit

The invention claimed is:

1. An information processing apparatus connected to a first display device browsed by a first user and a second display device browsed by a second user, comprising:
 a program execution unit configured to: (i) execute a program for drawing one or more videos for the first display device and the second display device to individually display, and (ii) switch between a common display mode for drawing one or more common videos among the one or more videos that both the first display device and the second display device commonly display, and an individual display mode for drawing separate videos, including a first video for the first display device to individually display and a second video for the second display device to individually display;
 an additional video drawing unit configured to draw an additional video different from the one or more videos drawn by the program execution unit; and
 a display control unit configured to allow: (i) the first display device and the second display device to display the one or more videos drawn by the program execution unit, (ii) both the first display device and the second display device to display a synthesized video obtained by synthesizing the common video and the additional video in the common display mode, and (iii) the first display device to display a synthesized video obtained by synthesizing the first video and the additional video and simultaneously allow the second display device to display the second video in the individual display mode.

2. The information processing apparatus according to claim 1, wherein when drawing the additional video, the additional video drawing unit performs switching from the individual display mode to the common display mode independently of the program execution unit, and when the additional video drawing unit performs switching to the common display mode while the program execution unit draws two videos of the first video and the second video, the display control unit allows both the first display device and the second display device to display a synthesized video obtained by synthesizing the first video and the additional video.

3. The information processing apparatus according to claim 2, wherein when the additional video is drawn in accordance with a request from any one of the first user and the second user and the additional video is drawn in accordance with a request from the second user, the additional video drawing unit performs switching to the common display mode.

4. The information processing apparatus according to claim 3, wherein when the additional video is drawn in accordance with a request from the first user, the additional video drawing unit draws an additional video in which a background region is transparent and, when the additional video is drawn in accordance with a request from the second user, draws an additional video in which a background region is painted out.

5. The information processing apparatus according to claim 3, wherein the first display device is a display device used by mounting to a head section of a user, and the display control unit performs head tracking control for changing a video that the first display device is allowed to display in accordance with a change in an attitude of the first display device and, when performing switching to the common display mode in accordance with a request from the second user, the additional video drawing unit interrupts the head tracking control.

6. An information processing method for allowing a first display device browsed by a first user and a second display device browsed by a second user to display a video, comprising:

executing a program for drawing one or more videos for the first display device and the second display device to individually display, and (ii) switching between a common display mode for drawing one or more common videos among the one or more videos that both the first display device and the second display device commonly display, and an individual display mode for drawing separate videos, including a first video for the first display device to individually display and a second video for the second display device to individually display;

drawing an additional video different from the one or more videos drawn by the executing step; and allowing: (i) the first display device and the second display device to display the one or more videos drawn by the program execution unit, (ii) both the first display device and the second display device to display a synthesized video obtained by synthesizing the common video and the additional video in the common display mode, and (iii) the first display device to display a synthesized video obtained by synthesizing the first video and the additional video and simultaneously allow the second display device to display the second video in the individual display mode.

7. A non-transitory, computer readable storage medium containing a computer program, which when executed by a computer connected to a first display device browsed by a first user and a second display device browsed by a second user, causes the computer to carry out actions, comprising:

executing a program for drawing one or more videos for the first display device and the second display device to individually display, and (ii) switching between a common display mode for drawing one or more common videos among the one or more videos that both the first display device and the second display device commonly display, and an individual display mode for drawing separate videos, including a first video for the first display device to individually display and a second video for the second display device to individually display;

drawing an additional video different from the one or more videos drawn by the executing step; and allowing: (i) the first display device and the second display device to display the one or more videos drawn by the program execution unit, (ii) both the first display device and the second display device to display a synthesized video obtained by synthesizing the common video and the additional video in the common display mode, and (iii) the first display device to display a synthesized video obtained by synthesizing the first video and the additional video and simultaneously allow the second display device to display the second video in the individual display mode.

* * * * *